United States Patent
Anson et al.

(10) Patent No.: US 9,307,376 B2
(45) Date of Patent: *Apr. 5, 2016

(54) SELECTING INFORMATION HANDLING SYSTEM COMMUNICATION PROTOCOL BASED ON NETWORK CONSTRAINTS

(71) Applicant: Dell Products L.P., Round Rock, TX (US)

(72) Inventors: Douglas M. Anson, Dripping Springs, TX (US); Arthur R. Toy, Austin, TX (US); Wendy E. Dilliard, Chicago, IL (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,586

(22) Filed: Jan. 9, 2015

(65) Prior Publication Data

US 2015/0124658 A1  May 7, 2015

Related U.S. Application Data

(63) Continuation of application No. 13/753,812, filed on Jan. 30, 2013, now Pat. No. 8,971,315.

(51) Int. Cl.
| | |
|---|---|
| *H04W 4/16* | (2009.01) |
| *H04W 72/04* | (2009.01) |
| *H04M 7/00* | (2006.01) |
| *H04M 15/00* | (2006.01) |
| *H04W 84/04* | (2009.01) |
| *H04W 84/12* | (2009.01) |

(52) U.S. Cl.
CPC ............. *H04W 4/16* (2013.01); *H04M 7/0057* (2013.01); *H04M 15/8214* (2013.01); *H04M 15/887* (2013.01); *H04W 72/04* (2013.01); *H04W 84/04* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,065,043 | B2 * | 6/2006 | Wu et al. ...................... | 370/229 |
| 7,561,547 | B2 * | 7/2009 | Bridgelall ..................... | 370/329 |
| 8,170,564 | B2 * | 5/2012 | Sugiura et al. ................ | 455/442 |
| 8,279,850 | B2 | 10/2012 | Elias et al. | |
| 8,289,952 | B2 | 10/2012 | Larsson et al. | |
| 8,289,958 | B1 | 10/2012 | Narayanan | |
| 8,699,456 | B2 * | 4/2014 | Smadi et al. .................. | 370/331 |
| 2002/0085516 | A1 * | 7/2002 | Bridgelall ..................... | 370/329 |
| 2006/0007914 | A1 * | 1/2006 | Chandra et al. ............... | 370/352 |
| 2010/0035618 | A1 * | 2/2010 | Sugiura et al. ................ | 455/442 |
| 2012/0257512 | A1 * | 10/2012 | Lim .............................. | 370/242 |
| 2014/0003404 | A1 * | 1/2014 | Gillett et al. .................. | 370/338 |

FOREIGN PATENT DOCUMENTS

| | | |
|---|---|---|
| EP | 2442584 A1 | 4/2012 |
| EP | 1952652 B1 | 6/2012 |

* cited by examiner

*Primary Examiner* — Hong Cho
(74) *Attorney, Agent, or Firm* — Terrile, Cannatti, Chambers & Holland, LLP; Robert W. Holland

(57) ABSTRACT

Voice over Internet Protocol (VoIP) telephone calls at an information handling system are managed based upon data transfer allocations associated with an information handling system wireless wide area network (WWAN) account to reduce data transfer overages at the WWAN account. If data transfer associated with a WWAN account approaches an allocation threshold, VoIP telephone calls associated with the information handling system that would use WWAN data transfer are instead configured to proceed through a WWAN telephone call with a WWAN telephone number that does not use data transfer.

10 Claims, 3 Drawing Sheets

SELECTING INFORMATION HANDLING SYSTEM COMMUNICATION PROTOCOL BASED ON NETWORK CONSTRAINTS

BACKGROUND OF THE INVENTION

1. Field of the Invention

The present invention relates in general to the field of information handling system wireless communication, and more particularly to selecting an information handling system communication protocol based on network constraints.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems and wireless telephones have converged into "smartphone" devices that perform functions traditionally associated with both telephone communications and information processing. A typical smartphone includes a processor and a display with a touchscreen that accepts inputs from an end user. An end user places telephone calls through a wireless interface by inputting a telephone number or answering an incoming telephone call indication through the touchscreen. The end user also uses the touchscreen to perform email and web browsing by interacting with applications through the touchscreen.

Initially, mobile wireless telephones interacted with a wireless wide area network (WWAN) primarily to communicate voice information through telephone calls. Mobile wireless telephones made telephone calls through the WWAN with traditional circuits. End users typically purchased telephone plans from network providers that gave the user a certain number of minutes of talking time per billing period, such as monthly. As mobile telephones became "smarter" by including web browsing and email functions, end users would receive a quantity of data to download and upload per billing period in addition to minutes of talking time. The introduction of data transfer by Internet Protocol (IP) made telephone calls with Voice over IP VoIP) possible by sending voice as data. Generally, mobile telephones initially transferred data through the WWAN at slow rates that did not strain network data capabilities; however, as mobile telephone processing and communication components have improved, data transfer has increased to a point at which many network providers have reached the capacity of wireless networks. For example, end users often send pictures and movies taken by cameras integrated in the mobile telephone as attachments to emails and text messages. Transfer of audiovisual information tends to consume an end user's data allocation even where the end user may have "talk" minutes remaining.

One solution that helps to conserve a mobile telephone data allocation is to transfer data when possible through a wireless local area network (WLAN) interface with the mobile telephone. To accomplish this, many mobile telephones includes an 802.11(g), (n) or other WLAN interface that automatically connects to available networks to send data so that WWAN data allocations are not consumed. In some instances, WLAN interfaces are used to also support telephone communications by establishing a voice over Internet Protocol (VoIP) interface through the Internet with a WLAN interface. As an example, an enterprise might include a Session Initiation Protocol (SIP) server that assigns end users a telephone number for establishing VoIP telephone calls through a WLAN interface to a mobile telephone. An end user makes and receives telephone calls through the VoIP telephone number at a mobile telephone using an Internet interface with the SIP server and also makes and receives telephone calls at the mobile telephone with a primary telephone number that access the telephony network through the WWAN of a telephone network provider. A difficulty of this is that a VoIP telephone call that sends voice communication through the Internet typically consumes an end user's data allocation if the Internet interface is established through a WWAN instead of a WLAN.

SUMMARY OF THE INVENTION

Therefore a need has arisen for a system and method which selects an information handling system communication protocol based upon network constraints.

In accordance with the present invention, a system and method are provided which substantially reduce the disadvantages and problems associated with previous methods and systems for selecting an information handling system communication protocol. Voice over Internet Protocol (VoIP) protocol telephone calls at an information handling system that use a data transfer allocation to communicate through a wireless wide area network (WWAN) internet interface are configured as WWAN protocol telephone calls that do not use the data transfer allocation if a data transfer allocation associated with the information handling system reaches a predetermined constraint.

More specifically, a smartphone information handling system supports WWAN telephone protocol communications through a WWAN (also known as a WWAN circuit), and also supports data communications through the WWAN (also known as WWAN packets), such as Internet interfaces to communicate between a browser and websites or between an email module and email servers. Data communications through the WWAN have a data allocation constraint that increases costs after a data allocation threshold is met. A call allocation module monitors the data allocation usage associated with the information handling system to adjust communication protocol usage when the data allocation usage reaches a predetermined amount, such as the limit imposed by in a monthly billing plan. For example, inbound VoIP telephone calls to the information handling system that would normally occur through a data allocation WWAN interface are instead forwarded to a WWAN telephone number for communication as a WWAN telephone call. As another example, outbound VoIP telephone calls from the information handling system that an end user attempts to initiate from a VoIP telephone number are instead automatically initiated as a WWAN telephone call with the WWAN telephone number. The use of the WWAN telephone protocol to support telephone communications instead of the VoIP telephone protocol avoids or limits consumption of a data allocation for transfer of data through the WWAN by the information handling system.

The present invention provides a number of important technical advantages. One example of an important technical advantage is that an information handling system, such as an Internet-capable mobile telephone, selectively communicates voice information through a WWAN or WLAN protocol based upon constraints associated with the WWAN. For example, the use of a VoIP protocol through an Internet interface is restricted if the WWAN channel is available for use with data transfer constraints. An end user who attempts to receive or make a VoIP telephone call has the call automatically routed through a traditional WWAN telephone account if the WWAN account is constrained with respect to data limits through an Internet interface. For instance, if an end user attempts to initiate a telephone call with a VoIP telephone number that will use a WWAN Internet interface, the call is instead automatically initiated with a WWAN telephone circuit by dialing the call from a WWAN telephone number account to avoid exceeding a data transfer constraint associated with the WWAN account. Similarly, inbound telephone calls to a VoIP telephone number automatically route to a WWAN telephone number if a mobile telephone's Internet is established through a WWAN that has a data transfer constraint. This prevents the use of WWAN data allocation use to support VoIP telephone calls where constraints on the data allocation will increase the cost of the telephone call.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Managing VoIP telephone calls at an information handling system interfaced with a WWAN limits costs related to data allocation overages in a WWAN account associated with the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
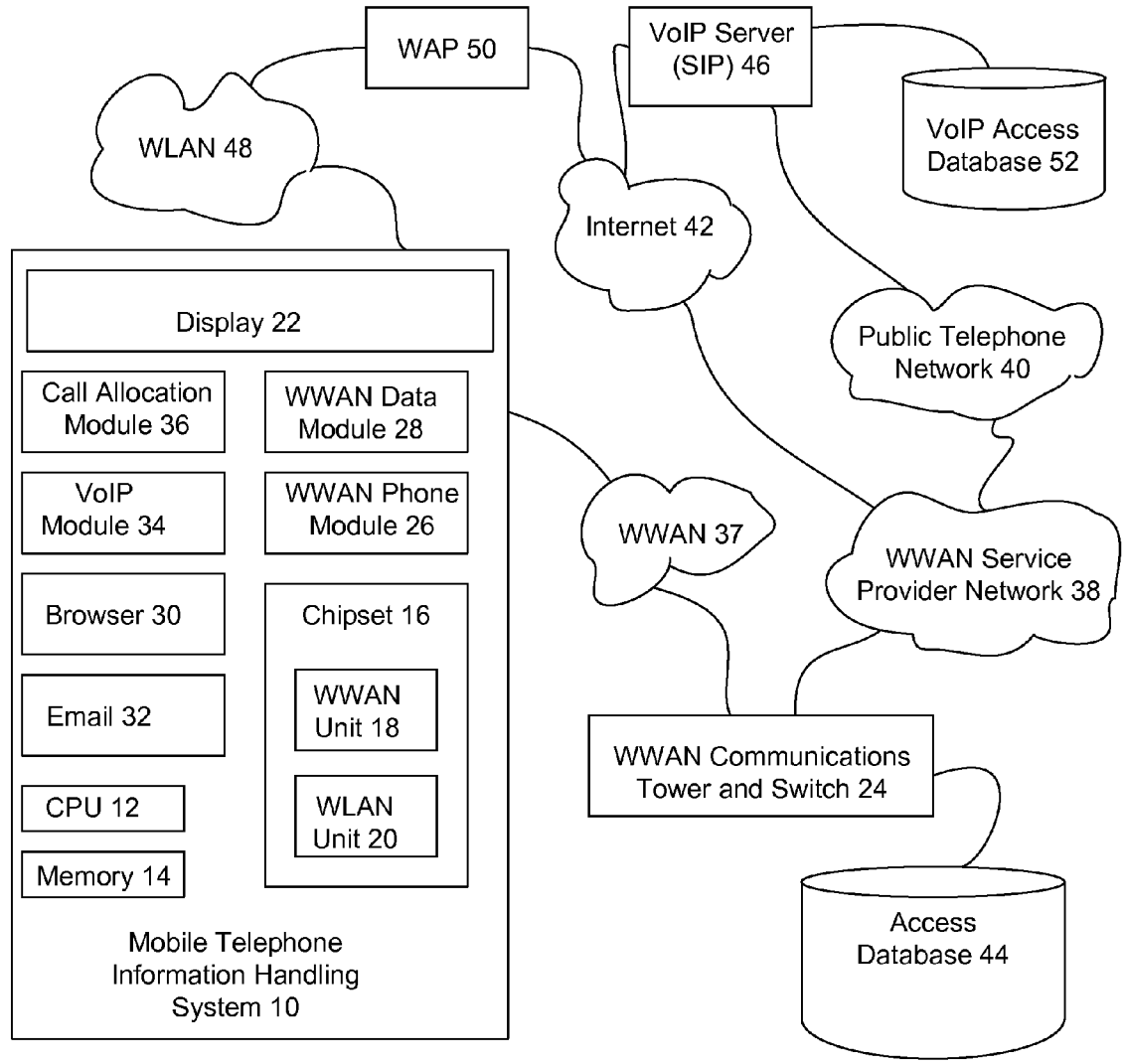
FIG. 1 depicts a block diagram of a system for selecting information handling system communication protocols based upon network constraints.

Referring now to FIG. 1, a block diagram depicts a system for selecting information handling system 10 communication protocols based upon network constraints. Information handling system 10 processes information with a processor 12 that executes instructions and with a memory 14 interfaced with processor 12 that stores the information and instructions. A chipset 16 includes processing components and memory to perform functions, such as a WWAN unit 18 that supports communication with a WWAN and a WLAN unit 20 that supports communication with a wireless local area network (WLAN), such as an 802.11(n) or similar interface. A touchscreen display 22 presents information to an end user and accepts end user inputs. For example, information handling system 10 is a smartphone system that establishes telephone communications with a WWAN telephone tower and switch 24 using a WWAN telephone communication protocol and also communicates data through a WWAN data interface using a WWAN data communication protocol, where the telephone and data information communicate through a WWAN telephone tower and switch 24. In one example embodiment, a WWAN phone module 26 provides telephone communications through a WWAN interface with a WWAN telephone protocol in association with a WWAN telephone number. A WWAN data module 28 provides data communications through a WWAN interface with a WWAN data protocol in association with the WWAN telephone number. Generally, WWAN data is communicated with Internet Protocol (IP) communications, such as TCP/IP packets that communicate webpage information in response to a browser 30 running on processor 12 or that communicate email information in response to an email application 32 running on processor 12.

Information handling system 10 supports telephone communications through WWAN protocol communications in a conventional manner and also supports Voice over Internet Protocol (VoIP) telephone communications with a VoIP module 34 that executes on processor 12 using a VoIP protocol. VoIP module 34 processes voice information with IP packets so that telephone communications are supported through an Internet interface. An Internet interface for supporting VoIP communications can include an Internet interface supported through a WLAN with WLAN unit 20 or an Internet interface supported through a WWAN with WWAN unit 18. In a situation where a VoIP telephone call is supported through a WWAN Internet interface, the voice communication information is communicated as data using a data protocol rather than as telephony using the WWAN telephone protocol. An advantage of having VoIP module 34 on information handling system 10 is that one or more VoIP telephone numbers may be supported on information handling system 10 without a separate telephone account by the end user with the WWAN provider for the additional VoIP telephone numbers. A disadvantage is that VoIP telephone call communications are made as data communications through the WWAN rather than voice communications and therefore consume an end user's WWAN data allocation as if the end user were browsing the web or reading email. Since a data allocation on a WWAN account is often limited and tracked separate than a voice allocation, end users who use VoIP telephone communications through a WWAN Internet interface can incur increased costs as the data allocation for the end user's account is exceeded.

To manage WWAN telephone account costs, a call allocation module 36 executing on processor 12 of information handling system 10 selects whether to allocate VoIP telephone calls for configuration through a WWAN as data or instead to establish VoIP telephone calls as WWAN telephone calls. As used herein, communication of information through a WWAN under a WWAN account against a data allocation means communication with a WWAN data protocol while communication of telephone call through a WWAN under a WWAN account against a voice allocation means communication with a WWAN telephone protocol. Communication of a VoIP telephone call with a VoIP telephone protocol consumes a data allocation by sending voice through a data interface, such as an Internet interface established through a WWAN. Call allocation module 36 manages configuration of VoIP telephone calls based upon network constraints to avoid charges for VoIP telephone calls when a data allocation for a WWAN account has become exhausted. If a data allocation is exhausted but WWAN telephone calls with a WWAN telephone protocol are supported without additional costs or with less cost than a VoIP data protocol telephone call, then call allocation module 36 reduces operating costs by configuring requested VoIP telephone calls as WWAN telephone calls. Thus, when a data allocation is exhausted, call allocation module 36 re-directs VoIP telephone calls that would consume a data allocation to a WWAN voice interface that does not consume the data allocation.

In the example embodiment depicted by FIG. 1, information handling system 10 establishes an outbound WWAN telephone call by communicating an outbound telephone number through WWAN 37 to WWAN communications tower and switch 24, which establishes the telephone call through the network provider's network 38 or public network 40 as appropriate. Similarly, inbound telephone calls to a WWAN telephone number associated with information handling system 10 are sent from the public network 40 and/or network provider's network 38 to a communications tower and switch 24 for connection with information handling system 10 through WWAN 37. Information handling system 10 interacts through WWAN 37 to access Internet 42 using data communication protocols so that an end user can access websites and email with information handling system 10 using information communicated through WWAN 37 as part of a WWAN account. A WWAN access database 44 tracks WWAN access to ensure that information handling systems are authorized to make access to WWAN 37 and to track access for billing purposes. For instance, information handling system 10 has a WWAN telephone number that is used to track WWAN telephone call talk time and WWAN data allocation usage. In some instances, plural information handling systems share WWAN resources, such as talk and data allocations, with access database 44 tracking usage by reference to a WWAN telephone number of each information handling system 10 or similar tracking techniques, such as with IMSI. Various WWAN network providers will track talk and data usage in a variety of ways and the particular way of tracking such usage is not intended to limit the present disclosure.

In the example embodiment depicted by FIG. 1, information handling system 10 establishes an outbound VoIP telephone call by inputting the outbound telephone number at display 22 to initiate the call with VoIP module 34. VoIP module 34 initiates communication with a VoIP server 46, such as a Session Initiation Protocol (SIP) server, through an Internet interface. VoIP server 46 coordinates the telephone call with the public telephone network 40. VoIP server also accepts telephone calls from the public telephone network 40 for a VoIP telephone number associated with information handling system 10 and initiates inbound VoIP telephone calls to information handling system 10 with an Internet interface. VoIP telephone calls are supported by Internet interfaces supported through a WLAN 48 interface of WLAN unit 20 with a wireless access point 50. Alternatively, if a WLAN Internet interface is not available, WWAN 37 interface of WWAN unit 18 may provide an Internet interface through communications tower and switch 24 with Internet 42 and then to VoIP server 46. A WLAN 48 Internet interface provides VoIP telephone communications without using any data or talk allocations for the WWAN account of information handling system 10 as tracked by the WWAN telephone number in access database 44.

Call allocation module 36 configures VoIP module 34 to selectively establish inbound and outbound telephone calls as either a VoIP call or a WWAN circuit call based upon the data allocation available to information handling system 10 through a WWAN account, such as a WWAN account tracked by a WWAN telephone number in access database 44. If a data allocation available for use by information handling system 10 falls within a predetermined threshold, such as exhaustion or approaching exhaustion, then call allocation module 36 selectively configures VoIP telephone requests as WWAN telephone calls with a WWAN telephone protocol, such as by using a WWAN telephone number. For instance, if an end user attempts to initiate a VoIP telephone call from information handling system 10 when the data allocation for WWAN 37 access is exhausted at information handling system 10, then the telephone call is instead initiated as a WWAN circuit telephone call. Using the WWAN telephone talk allocation instead of the data allocation reduces operating costs where the data allocation has exhausted or approached exhaustion. As another example, if an inbound VoIP telephone is detected by call allocation module 36 when the data allocation threshold is met, the inbound VoIP telephone call is forwarded from VoIP server 46 to a WWAN telephone number associated with information handling system 10 so that the telephone call is answered at information handling system 10 as a WWAN telephone call instead of a VoIP telephone call. Although call allocation module 36 is depicted as a software or firmware module executing on a processing component of information handling system 10, in alternative embodiments call allocation module 36 may reside at other locations or be distributed to plural locations, such as VoIP server 46 and communications tower and switch 24. For example, data allocation for a WWAN telephone number may be stored at VoIP server 46 so that VoIP telephone calls to VoIP telephone numbers associated in the database with a WWAN telephone number are automatically forwarded to a WWAN telephone number if the data allocation threshold is met. As another example, a call allocation module 36 distributed to each of plural information handling systems that have a shared data allocation communicates data allocation consumption between the information handling systems to avoid exceeding a data allocation of a shared WWAN plan.

In one example embodiment, VoIP server 46 maintains a VoIP access database that tracks VoIP telephone numbers serviced and WWAN telephone numbers associated with the VoIP telephone numbers. VoIP server 46 accesses WWAN telephone number account information from WWAN access database 44 and retrieves information regarding VoIP phone number related WWAN telephone accounts, such as data usage, data limits, carrier limits, user-defined limits, primary directory number, call forwarding number, billing cycle, etc. . . . VoIP server 46 applies the WWAN account information to relate VoIP telephone numbers to WWAN telephone numbers, relate data allocations to VoIP telephone numbers and set thresholds for managing the use of VoIP or WWAN telephone calls at an information handling system. For instance, some example thresholds and limits might include monthly data limits, monthly WWAN account billing cycle, primary voice number, user-preferences for taking steps to preserve a data allocation, carrier preferences for VoIP usage and data allocation preservation, carrier peak usage trends and costs for avoiding data congestion, and shared data allocations between multiple information handling systems. In one embodiment, preferences for VoIP versus WWAN telephone calls may be established based upon the identity of a calling network, such as the carrier that an information handling system is interfaced with.

Call allocation module 36 runs in the background on information handling system 10 to aid collection an application of WWAN account information. For example, call allocation module 36 periodically updates data allocation remaining for its account and related accounts, such as a shared plan, and sends the account information to VoIP server 46 to aggregate data usage and determine when a threshold is met for altering the operation of VoIP telephone calls as described above. When a data allocation threshold is met due to limited or exhausted WWAN account data allocation, a notice is provided to the end user and VoIP telephone calls will initiate as WWAN telephone calls. In various embodiments, call allocation module 36 may react to data allocation limits in varying ways. For example, if a data allocation threshold is met, call allocation module 36 may allow a VoIP telephone call to proceed through a WLAN interface with the VoIP protocol and then transfer the call to a WWAN telephone number if the information handling system leaves the WLAN, such as might be indicated by a GPS or reception signal indication. As an alternative, call allocation module 36 may determine whether to configure a VoIP call through a WLAN based upon a likelihood that the VoIP call will be completed in the WLAN, such as by analysis of the identity of the WLAN, GPS position, time of day etc. . . . . . If the call allocation module determines a likelihood of a loss of a WLAN Internet interface before completion of a VoIP call, such as due to low signal strength, the use of data allocation is avoided by transferring the VoIP call to a WWAN call rather than to a VoIP call supported by a WWAN Internet interface. Similarly, the call allocation module may transfer WWAN calls to VoIP calls, such as when the end user reaches a WLAN signal strength, a GPS location, a time of day or other factor.

Figure 2:
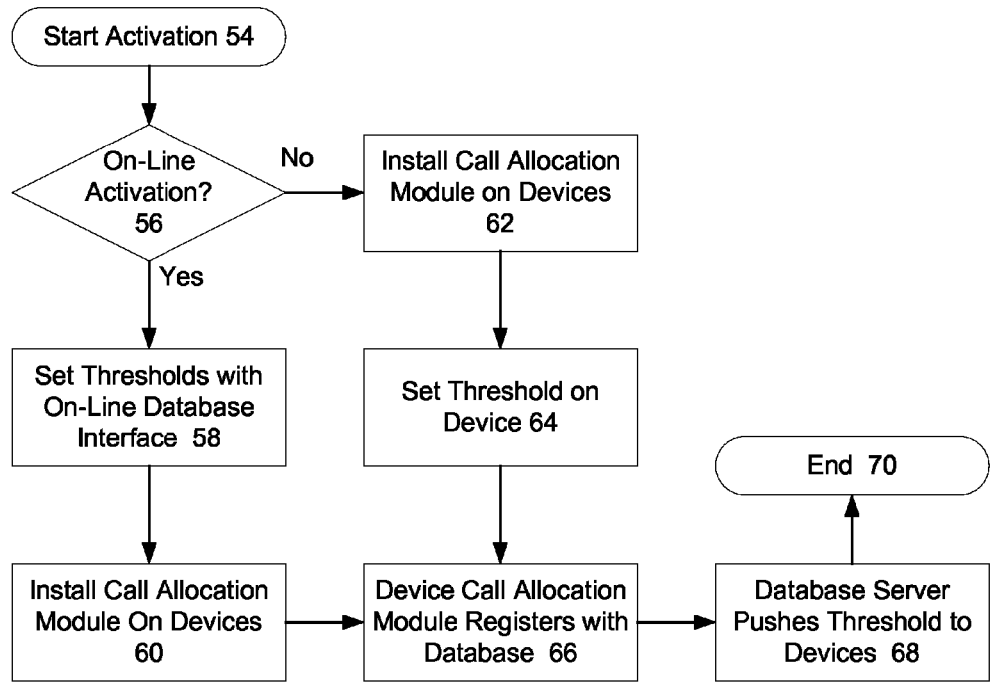
FIG. 2 depicts a flow diagram of a process for activating information handling system data allocation usage for managing VoIP telephone calls through a WWAN.

Referring now to FIG. 2, a flow diagram depicts a process for activating information handling system data allocation usage for managing VoIP telephone calls through a WWAN. The first time that a data allocation module registers an information handling system to an access database, the access database pushes down user defined thresholds and limits for data allocation. If the thresholds and limits are adjusted over time, the access database pushes down updated thresholds and limits as needed. The process starts at step 54 with end user initiation of the activation process for managing VoIP telephone calls through a WWAN. At step 56, a determination is made of whether a user activated threshold data allocation is available on line or must be installed at the information handling system. If yes at step 56, the process continues to the step 58 for the user to set data allocation threshold limits at the access database, such as predetermined amount of data allocation remaining at which VoIP protocol WWAN Internet interface management will initiate. At step 60, call allocation module 36 is installed on the information handling system to monitor VoIP usage. In addition, call allocation module 36 is installed on information handling systems 10 that share a data allocation so that each information handling system may provide data allocation usage to the access database. If at step 56 user activated on-line thresholds are not present, the process continues to step 62 for installation of call allocation module 36 on each of the information handling systems that share in a data allocation. At step 64, a data allocation threshold is set for the information handling system at which point VoIP calls placed over a WWAN Internet interface will be altered to take place as WWAN telephone calls. At step 66, call allocation modules installed on information handling systems register with the access database. At step 68, the access database pushes threshold limits to the information handling systems at which VoIP call management will initiate. The process ends at step 70.

Figure 3:
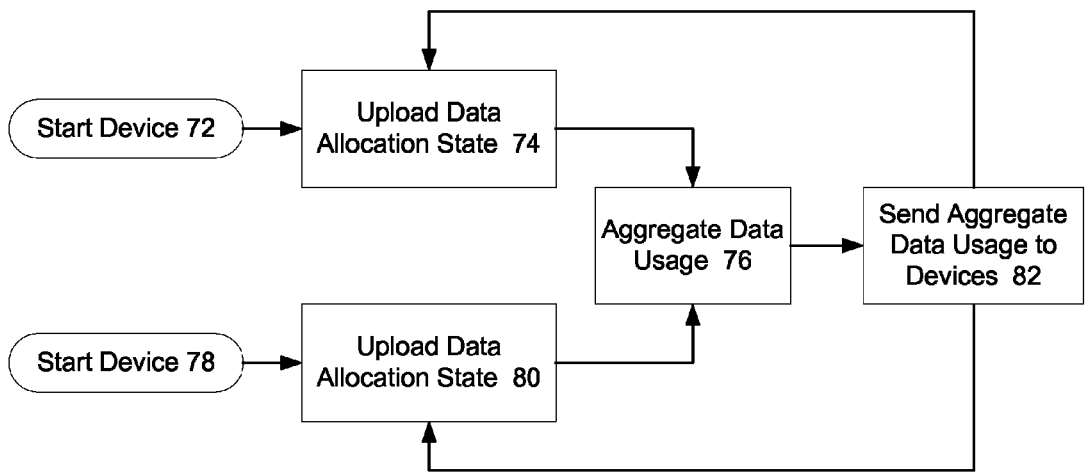
FIG. 3 depicts a flow diagram of a process for monitoring information handling system data allocation usage for managing VoIP telephone calls through a WWAN.

Referring now to FIG. 3, a flow diagram depicts a process for monitoring information handling system data allocation usage for managing VoIP telephone calls through a WWAN. At step 72, an end user activates an information handling system having a call allocation module, such as by powering up the system or interfacing with a network. At step 74, the call allocation module provides data allocation state information to an access database associated with a VoIP server. In one embodiment, updates are performed by WLAN Internet interfaces only when a data allocation expiration state exists. At step 76, the database server aggregates data allocation usage. Aggregation of data allocation usage includes usage obtained from other information handling systems associated with a shared data plan. At step 78, other information handling system that share a data plan are activated and, at step 80, report data allocation usage to the VoIP server access database so that aggregation of data allocation may be accomplished across all devices that share a data plan. At step 82, the VoIP server access database returns the total data allocation remaining to the call allocation module so that the call allocation module can apply the data allocation to determine management of VoIP telephone calls through a WWAN Internet interface.

Figure 4:
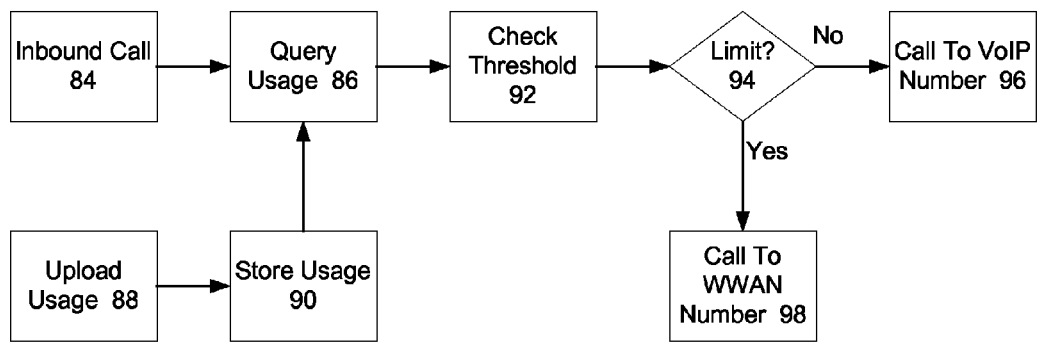
FIG. 4 depicts a flow diagram of a process for managing inbound VoIP telephone calls for at a VoIP server for an information handling system interfaced with a WWAN.

Referring now to FIG. 4, a flow diagram depicts a process for managing inbound VoIP telephone calls for at a VoIP server for an information handling system interfaced with a WWAN. When a VoIP server, such as a SIP server, receives an incoming call for a VoIP telephone number, the VoIP server queries the access database to determine if a WWAN account associated with the VoIP telephone number has met a data allocation threshold and, if so, configures the VoIP telephone call to instead proceed as a WWAN telephone call so that data allocation is not consumed by the VoIP telephone call. For instance, the call to the VoIP telephone number is automatically call forwarded to a WWAN telephone number associated with the VoIP number. Although the example embodiment performs configuration of the VoIP call into a WWAN call at the VoIP server, in alternative embodiments, a call allocation module at an information handling system can forward calls to a WWAN number when appropriate. Such an embodiment allows selective use of WLAN Internet interfaces to support a VoIP call based on analysis at the information handling system, as described above.

At step 84, an inbound telephone call is placed to a VoIP telephone number and routed to a VoIP server. At step 86, the VoIP server queries an access database to determine the data allocation state of the WWAN account associated with the VoIP telephone number. The data allocation state is generated from uploads at step 88 of data usage by information handling systems for storage at step 90. At step 92, the VoIP server compares the data allocation state for the WWAN account associated with the VoIP telephone number to a data allocation threshold for the VoIP telephone number. At step 94, a determination is made of whether the data allocation threshold is met. If not, the process continues to step 96 to deliver the VoIP telephone call using VoIP protocol and an Internet interface. If so, the process continues to step 98 to forward the call to a WWAN telephone number for delivery using a WWAN telephone call protocol that avoids a data interface.

Figure 5:
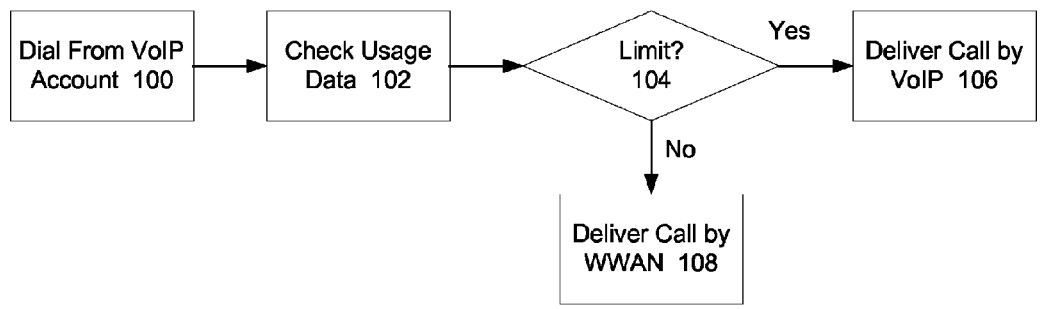
FIG. 5 depicts a flow diagram of a process for originating VoIP telephone calls from an information handling system interfaced with a WWAN.

Referring now to FIG. 5, a flow diagram depicts a process for originating VoIP telephone calls from an information handling system interfaced with a WWAN. When a user originates a VoIP telephone call, the call allocation module on the information handling system verifies whether a data allocation threshold has been met to deliver the VoIP telephone call with a VoIP protocol if data allocation remains and to deliver the telephone call with a WWAN telephone protocol if data allocation is exhausted. The process starts at step 100 when a user dials a number using a VoIP module running on the information handling system. At step 102, the call allocation module retrieves the data allocation usage for the information handling system. At step 102, the data allocation usage is compared with a threshold value at which VoIP telephone processing is altered to conserve data allocation. If the threshold is not met, the process continues to step 106 to deliver the call with a VoIP protocol. If the threshold is met, the process continues to step 108 to place the call with a WWAN telephone number available on the information handling system that does not consume data allocation.

Although the present invention has been described in detail, it should be understood that various changes, substitutions and alterations can be made hereto without departing from the spirit and scope of the invention as defined by the appended claims.

What is claimed is:

1. A method for initiating a telephone call at an information handling system, the method comprising:
    detecting a predetermined data allocation state associated with a wireless wide area network (WWAN) account of the information handling system, the WWAN account having a WWAN telephone number that includes a data allocation to communicate data and a telephone call allocation to place telephone calls;
    detecting a request for a voice over Internet Protocol (VoIP) telephone call associated with the information handling system, the VoIP call associated with a VoIP account having a VoIP telephone number, the VoIP telephone call to be communicated as data packets allocated to the data allocation; and
    reconfiguring the VoIP telephone call to initiate as a WWAN telephone call associated with the WWAN account, wherein the WWAN telephone call is placed with a telephone call allocation that does not use the data allocation associated with the WWAN account.

2. The method of claim 1 wherein:
    detecting a request for a VoIP telephone call further comprises detecting an incoming telephone call at a VoIP server to a VoIP telephone number associated with the information handling system; and
    reconfiguring the VoIP telephone call to initiate as a WWAN telephone call further comprises forwarding the VoIP telephone call from the VoIP server to a WWAN telephone number associated with the information handling system.

3. The method of claim 1 wherein:
    detecting a request for a VoIP telephone call further comprises detecting initiation of a VoIP telephone call with a VoIP telephone number at the information handling system; and
    reconfiguring the VoIP telephone call to initiate as a WWAN telephone call further comprises sending the telephone call from the information handling system with a WWAN telephone number through the WWAN.

4. The method of claim 1 wherein the predetermined data allocation state comprises exhaustion of data allocation for the WWAN account.

5. The method of claim 4 wherein the predetermined data allocation state comprises exhaustion of data allocation shared by the WWAN account with plural other WWAN accounts.

6. An information handling system comprising:
    a housing;
    a processor disposed in the housing and operable to process information;
    memory disposed in the housing and interfaced with the processor, the memory operable to store the information;
    a wireless wide area network (WWAN) unit interfaced with the processor and operable to establish a WWAN interface;
    a wireless local area network (WLAN) unit interfaced with the processor and operable to establish a WLAN interface;
    a WWAN telephone module operable to establish a WWAN telephone call through the WWAN interface with a WWAN telephone number associated with a WWAN account and to communicate data, the WWAN telephone call using a telephone call allocation of the WWAN account, the data using a data allocation of the WWAN account;
    a VoIP telephone module operable to establish a VoIP telephone call through the WWAN interface or through the WLAN interface, the VoIP telephone call established with a VoIP telephone number associated with a VoIP account, the VoIP telephone call using the WWAN data allocation when placed through the WWAN; and
    a call allocation module interfaced with the WWAN telephone module and the VoIP telephone module and operable in response to a predetermined condition to configure the VoIP telephone call as WWAN telephone call, the predetermined condition including at least data allocation remaining on the WWAN account of less than a predetermined amount.

7. A system for selecting an information handling system communication protocol based upon network constraints, the system comprising:
    an information handling system having a wireless wide area network (WWAN) interface and a wireless local area network (WLAN) interface;
    a WWAN telephone module executing on the information handling system to establish a WWAN telephone call with a WWAN protocol and associated with a WWAN account having a WWAN telephone number through the WWAN interface, the WWAN account having a telephone call allocation and a data allocation;
    a VoIP telephone module executing on the information handling system to establish a VoIP telephone call with a VoIP protocol and associated with a VoIP account having a VoIP telephone number through the WLAN interface or the WWAN interface; and a call allocation module operable to configure a VoIP telephone call at the information handling system to interface through the WWAN interface with the VoIP protocol in the absence of a predetermined network constraint and with the WWAN protocol using the telephone call allocation in the presence of a predetermined constraint, wherein the predetermined constraint comprises a predetermined amount of remaining data allocation in the WWAN account.

8. The system of claim 7 wherein the call allocation module resides on the information handling system.

9. The system of claim 8 wherein the call allocation module resides on a WWAN switch that supports WWAN telephone calls with the information handling system at the WWAN telephone number.

10. The system of claim 7 wherein the call allocation module resides on a VoIP server that supports VoIP telephone call interfaces with the information handling system at the VoIP telephone number.

* * * * *